(12) United States Patent
Kubo et al.

(10) Patent No.: US 8,261,097 B2
(45) Date of Patent: Sep. 4, 2012

(54) DATA RECORDER HAVING DATA ENCRYPTION FUNCTION AND DATA REPRODUCING DEVICE

(75) Inventors: Mitsumasa Kubo, Tachikawa (JP); Akira Shinohara, Hanno (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1024 days.

(21) Appl. No.: 11/963,672

(22) Filed: Dec. 21, 2007

(65) Prior Publication Data
US 2008/0162945 A1 Jul. 3, 2008

(30) Foreign Application Priority Data

| Dec. 28, 2006 | (JP) | 2006-355248 |
| Jan. 10, 2007 | (JP) | 2007-002483 |
| Jan. 15, 2007 | (JP) | 2007-005534 |

(51) Int. Cl.
*G06F 12/14* (2006.01)
(52) U.S. Cl. ........ 713/193; 713/190; 713/194; 380/228; 380/241; 380/277; 380/231; 380/234; 705/57; 705/59; 369/26.01; 369/30.03; 369/30.05
(58) Field of Classification Search .................. 713/190, 713/180
See application file for complete search history.

(56) References Cited

U.S. PATENT DOCUMENTS

| 4,734,901 A * | 3/1988 | Murakami | 369/59.25 |
| 2003/0151991 A1 * | 8/2003 | Kitani et al. | 369/47.13 |
| 2004/0215970 A1 | 10/2004 | Handa | |
| 2005/0060570 A1 * | 3/2005 | Ueda | 713/200 |
| 2005/0149745 A1 | 7/2005 | Ishidoshiro | |
| 2006/0126465 A1 | 6/2006 | Yamauchi | |
| 2006/0152599 A1 | 7/2006 | Yokonuma | |
| 2008/0098239 A1 * | 4/2008 | Wada et al. | 713/193 |

FOREIGN PATENT DOCUMENTS

| JP | 8-69357 A | 3/1996 |
| JP | 11-272563 A | 10/1999 |

(Continued)

OTHER PUBLICATIONS

Office Action mailed Nov. 9, 2010, in the corresponding Japanese Application No. JP 2007-005534, 5 pages. (+ Translation).

(Continued)

*Primary Examiner* — Nathan Flynn
*Assistant Examiner* — Bryan Wright
(74) *Attorney, Agent, or Firm* — Seed IP Law Group PLLC

(57) ABSTRACT

A data recording apparatus and a data reproducing apparatus which ensure security of a portable recording medium, such as an optical disk. The apparatus has a security mode and a normal mode as operation modes. In the security mode, a system controller of the apparatus records a security identification signal in an area other than a user data area of the optical disk. At the time of copying of the optical disk, the security identification signal disappears, and a limitation is imposed on reproduction, thereby preventing copying operation. In the security mode, the system controller records the security identification signal in the area other than the user data area of the optical disk, as well as recording user data by means of converting an address through use of a password. At the time of reproduction of data, absence or presence of the security identification signal is ascertained. When the security identification signal is present, the address is inversely converted, thereby reproducing data.

11 Claims, 5 Drawing Sheets

FOREIGN PATENT DOCUMENTS

| | | |
|---|---|---|
| JP | 2001-155421 A | 6/2001 |
| JP | 2001-197041 A | 7/2001 |
| JP | 2001-243753 A | 9/2001 |
| JP | 2001-332022 A | 11/2001 |
| JP | 2001319329 A | 11/2001 |
| JP | 2002-42415 A | 2/2002 |
| JP | 2002-124027 A | 4/2002 |
| JP | 2002-203361 A | 7/2002 |
| JP | 2003-298994 A | 10/2003 |
| JP | 2003-303136 A | 10/2003 |
| JP | 2004030779 A | 1/2004 |
| JP | 2004-265570 A | 9/2004 |
| JP | 2004-326848 A | 11/2004 |
| JP | 2005-173197 A | 6/2005 |

OTHER PUBLICATIONS

Notice of Grounds for Rejection (JP) dated Jan. 20, 2009, issued in corresponding Japanese Application No. 2006-355248.

Japanese Office Action in corresponding Japanese Application No. 2007002483, mailed Apr. 12, 2011, 5 pages.

* cited by examiner

DATA RECORDER HAVING DATA ENCRYPTION FUNCTION AND DATA REPRODUCING DEVICE

PRIORITY INFORMATION

This application claims priority to Japanese Patent Application No. 2006-355248 filed on Dec. 28, 2006, No. 2007-002483 filed on Jan. 10, 2007, and No. 2007-005534 filed on Jan. 15, 2007, which are incorporated herein by reference in its entireties.

BACKGROUND

1. Technical Field

The present invention relates to a device for encrypting data and recording the encrypted data in a portable recording medium.

2. Related Art

When data are recorded in a portable recording medium, such as a CD or a DVD, there is always a risk of data leakage, which will be caused by loss, theft, or the like, because the medium is freely portable. For this reason, there has been known a technique for recording key data in a portable recording medium, determining whether or not the key data of the portable recording medium coincides with key data set in a drive which performs recording and reproduction of data, and enabling the drive to record or reproduce the data only when a coincidence exists.

JP 11-272563 A describes storing a password encrypted as an authentication key in a recording device, connecting the recording device to portable information equipment when the portable equipment is utilized, and compares the password input by a user with authentication information about the connected storage device, thereby authenticating the user.

JP 2001-197041 A describes decrypting encrypted data in accordance with an input security key, to thus decrypt audio data.

JP 2003-303136 A describes recording key data required to decrypt encrypted data in a recording medium—which is different from a recording medium where the encrypted data are recorded—when the encrypted data are recorded in the recording medium and erasing the key data after reproduction of data, to thus ensure security.

JP 2005-173197 A describes removably providing a personal computer with a security key used for performing encryption and decryption, and automatically encrypting or decrypting data to be handled by a personal computer at the time of attachment of the key. Moreover, performing authentication when the security key is attached to the personal computer is also described.

SUMMARY

When key data are recorded in a portable recording medium and verified against key data stored in a drive, the key data may be a clue for decryption in the event of loss or theft of the portable recording medium. Further, in addition to the risk of leakage of key data, there is a risk of the portable recording medium being copied, and a technique for enabling effective prevention of copying has been desired. Moreover, in addition to the technique of protecting contents by encrypting data, a technique for enabling easy prevention of copying of a portable recording medium has been desired.

The present invention provides a data recorder for recording data in a portable recording medium, comprising:

data recording means for recording data in the portable recording medium; and identification information recording means for recording, in an area other than a user data area of the portable recording medium, identification information showing that data to be recorded are encrypted and recorded.

The present invention also provides a data recorder which records data in a portable recording medium, comprising:

first data recording means for recording at least a portion of file management information of data to be recorded into an area other than the user data area of the portable recording medium; and second data recording means for recording remaining data of the data to be recorded into the user data area of the portable recording medium.

Moreover, the present invention provides a data reproducing apparatus which reproduces data recorded in a portable recording medium, comprising:

retaining means for retaining key data;

determination means which, when data are reproduced from the portable recording medium, determines whether or not the identification information showing that data are recorded after being encrypted is recorded in an area other than the user data area of the portable recording medium; and reproducing means which, when the identification information is recorded, rearranges and reproduces the data read from the portable recording medium by use of the key data and which, when the identification information is not recorded, reproduces the data read from the portable recording medium without rearranging the data by use of the key data.

Further, the present invention provides a data recording-and-reproducing apparatus which reproduces data recorded in a portable recording medium, comprising:

retaining means for retaining key data;

recording means which records identification information showing that the data are recorded after being encrypted into an area other than a user data area of the portable recording medium when data are recorded in the portable recording medium and which converts an address of data to be recorded by use of the key data, to thus record data into the converted address; and determination means which, when data are reproduced from the portable recording medium, determines whether or not the identification information showing that data are recorded after being encrypted is recorded in an area other than the user data are of the portable recording medium; and reproducing means which, when the identification information is recorded, rearranges and reproduces the data read from the portable recording medium by use of the key data and which, when the identification information is not recorded, reproduces the data read from the portable recording medium without rearranging the data by use of the key data.

The invention will be more clearly comprehended by reference to the embodiment provided below. However, the following embodiment is merely illustrative, and the scope of the invention is not limited to the embodiment.

DETAILED DESCRIPTION

In relation to an embodiment of the present invention, an optical disk drive which records and reproduces data in and from an optical disk will be described by means of taking a recordable optical disk as an example portable recording medium.

Figure 1:
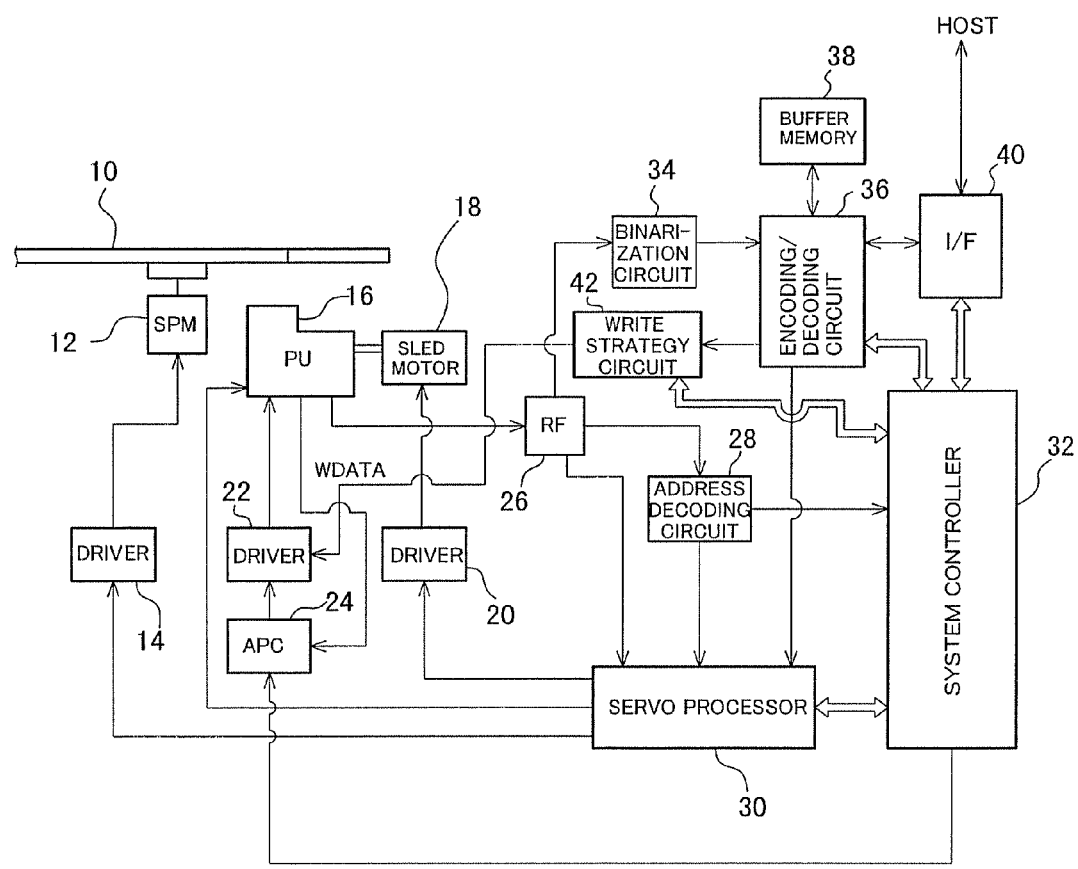
FIG. 1 is an overall block diagram of an optical disk drive.

FIG. 1 shows the overall configuration of an optical disk drive of the present embodiment. An optical disk 10, such as a CD, a DVD, an HD-DVD, a Blu-ray disk, and the like, is driven by a spindle motor (SPM) 12. The spindle motor 12 is driven by a driver 14, and the driver 14 is servo-controlled by a servo processor 30 so as to reach a desired rotational speed.

An optical pickup 16 includes a laser diode (LD) for radiating a laser beam onto the optical disk 10 and a photodetector (PD) which receives light reflected from the optical disk 10 and which converts the received light into an electrical signal; and is disposed opposite the optical disk 10. The optical pickup 16 is driven in a radial direction of the optical disk 10 by means of a sled motor 18 built from a stepping motor, and the sled motor 18 is driven by a driver 20. The driver 20 is servo-controlled by the servo processor 30 in the same manner as is the driver 14. The LD of the optical pickup 16 is driven by a driver 22, and the driver 22 is controlled by an automatic power controller (APC) circuit 24 in such a way that a drive current assumes a desired value. In accordance with a command from a system controller 32, the APC 24 and the driver 22 control the quantity of light emitted by the LD. In FIG. 1, the driver 22 is provided separately from the optical pickup 16, but the optical pickup 16 may also be equipped with the driver 22.

Recording and reproducing operations (in a normal operation mode) performed when the optical disk 10 is subjected to normal operation; that is, when the disk is not subjected to encryption, are as follows. When the data recorded in the optical disk 10 are reproduced, the LD of the optical pickup 16 emits a laser beam of reproducing power, and reflected light of the beam is converted into an electrical signal by the PD and subsequently output. A reproduced signal from the optical pickup 16 is supplied to an RF circuit 26. The RF circuit 26 generates, from the reproduced signal, a focus error signal and a tracking error signal and supplies the thus generated signals to the servo processor 30. In accordance with the error signals, the servo processor 30 servo-controls the optical pickup 16, thereby maintaining the optical pickup 16 in an on-focus state and an on-track state. The RF circuit 26 also supplies an address signal included in the reproduced signal to an address decoding circuit 28. The address decoding circuit 28 demodulates address data pertaining to the optical disk 10 from the address signal and supplies the data to the servo processor 30 and a system controller 32.

The address signal is a wobble signal, and address data are acquired by means of extracting the wobble signal from the reproduced signal and decoding the extracted wobble signal. The RE circuit 26 supplies a reproduced RF signal to a binarization circuit 34. The binarization circuit 34 binarizes the reproduced signal and supplies a resultantly-acquired signal to an encoding/decoding circuit 36. The encoding/decoding circuit 36 subjects the binarized signal to demodulation and error correction, to thus acquire reproduced data; and outputs the reproduced data to a host device, such as a personal computer, by way of an interface I/F 40. When the reproduced data are output to the host device, the encoding/decoding circuit 36 outputs the reproduced data after temporarily storing the data in buffer memory 38.

When data are recorded in the optical disk 10, data—which are to be recorded and which are output from the host device—are supplied to the encoding/decoding circuit 36 by way of the interface I/F 40. The encoding/decoding circuit 36 stores the data to be recorded into the buffer memory 38; encodes the data to be recorded; and supplies the encoded data as modulated data to a write strategy circuit 42. The write strategy circuit 42 converts the modulated data into a multi-pulse (a pulse train) in accordance with a predetermined recording strategy; and supplies the multipulse as recorded data to the driver 22. Since the recording strategy affects recording quality, the strategy is optimized prior to data recording. The laser beam whose power is modulated by the recorded data is emitted from the LD of the optical pickup 16, whereupon data are recorded in the optical disk 10. Recording power achieved during data recording operation is optimized by means of tentatively writing test data in a PCA (Power Calibration Area) formed along the inner radius of the optical disk 10 by means of OPC (Optical Power Control). After recording data, the optical pickup 16 emits a laser beam of reproducing power, to thus reproduce the recorded data; and supplies the reproduced data to an RF circuit 26. The RF circuit 26 supplies the reproduced signal to the binarization circuit 34, and the binarized data are supplied to the encoding/decoding circuit 36. The encoding/decoding circuit 36 decodes the modulated data and verifies the decoded data against the recorded data stored in the buffer memory 38. A result of verification is supplied to the system controller 32. The system controller 32 determines whether to successively record data in accordance with the result of verification or perform alternation processing. The system controller 32 controls operation of the entire system and drives the sled motor 18 by way of the servo processor 30, to thus control the position of the optical pickup 16. The system controller 32 controls OPC, thereby optimizing recording power.

In the meantime, in addition to having the normal operation mode, the optical disk drive of the present embodiment has a security mode. The security mode is one where data are encrypted and recorded in an optical disk and where encrypted data are decrypted and reproduced. In the present embodiment, the optical disk drive having the security mode is referred to as a "security drive," and an optical disk in which data are recorded after being encrypted by the security drive is referred to as a "security disk," as required. The system controller 32 determines whether to activate the device in a security mode or a normal operation mode. When the optical disk drive is connected to a personal computer, and the like, or incorporated into a personal computer, the system controller 32 determines the operation mode of the device in accordance with a command from an OS (operating system) or an application program of the personal computer. The user can determine whether to activate the device in a security mode by use of the application program or in a normal mode. In response to an inquiry command from the personal computer, the system controller 32 returns to the personal computer information showing that the optical disk drive is a "security drive" capable of operating in a security mode. On the basis of the information from the system controller 32, the application program (a security program) installed in the personal computer acknowledges that the connected or built-in optical disk drive is a security derive and accepts a mode setting request and a password from a user, thereby shifting the optical disk drive to a security mode.

Figure 2:
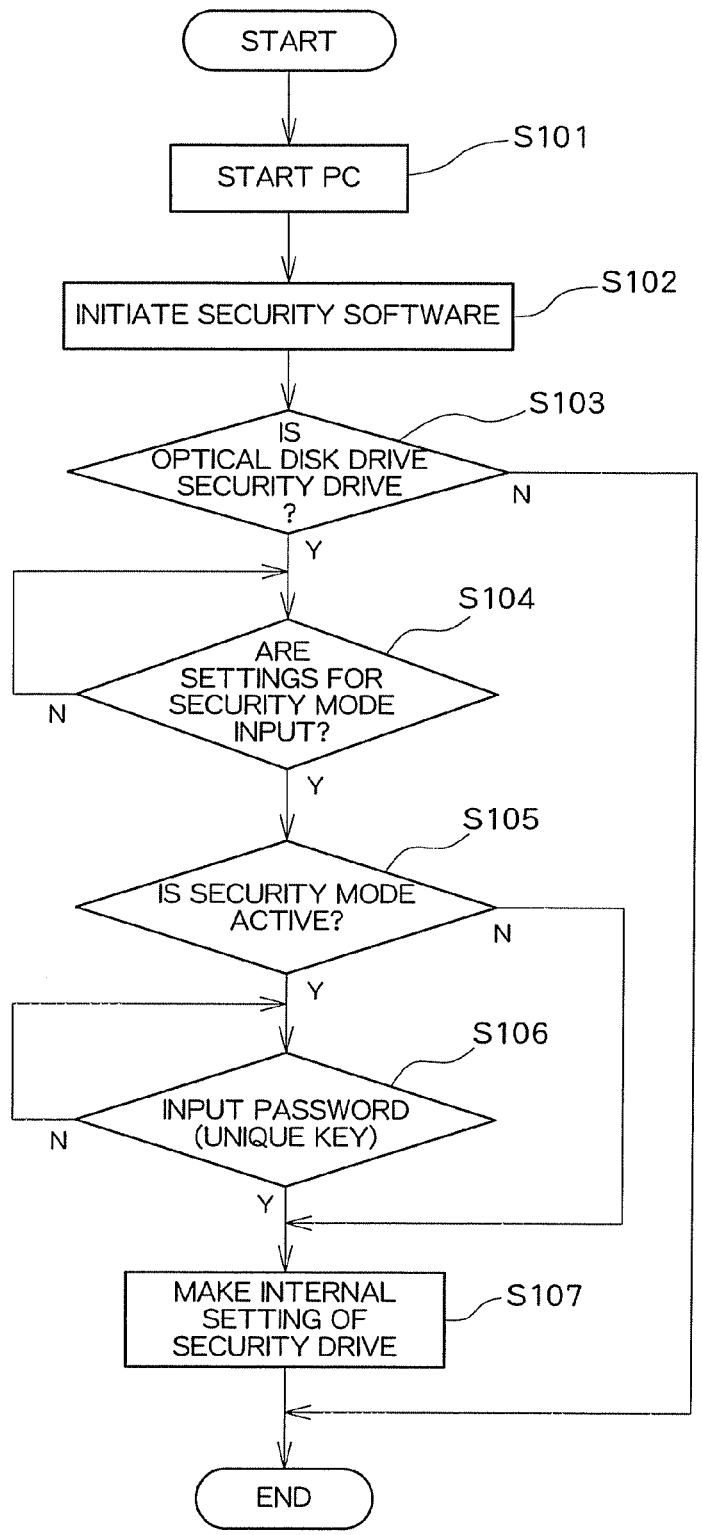
FIG. 2 is a flowchart of processing performed when a personal computer starts up.

FIG. 2 shows processing performed at boot-up of the personal computer which the optical disk drive shown in FIG. 1 is connected to or built in.

First, when the personal computer (PC) starts up (S101), the security program (security software) installed in the personal computer is initiated (S102). A manufacturer of the optical disk drive can provide a security program. The security program may also be installed in the personal computer from a recording medium, such as CD-ROM or DVD-ROM, or by way of a network. The security program is stored in RAM of the personal computer and sequentially executed by a CPU of the personal computer. The security program has, at least, a function of causing the personal computer to determine whether or not the connected or built-in optical disk drive is a "security drive" having a security mode; a function of causing the user to input key data required to operate in a security mode when the drive corresponds to the "security drive"; and a function of causing the personal computer to transmit the input key data to the system controller 32 of the optical disk drive by way of a communications interface.

When the security program starts up, the personal computer first determines whether or not the connected or built-in optical disk drive is a "security drive" (S103). The CPU of the personal computer sends an inquiry to the optical disk drive and determines, from information received from the system controller 32 of the optical disk drive, whether or not the optical disk drive is a "security drive." When the optical disk is not the security drive, the optical disk drive shifts to normal operation. When the optical disk drive is a "security drive," a determination is made as to whether or not settings of a security mode are input (S104). When the user desires inputting of the settings, a determination is made as to whether or not the security mode is active or inactive (S105). For instance, when the user selects Active Security Mode from a menu appearing on a screen of the personal computer, inputting of a password serving as unique key data is next requested (S106). When the user inputs the password, the CPU of the personal computer supplies the password to the system controller 32 of the optical disk drive. The system controller 32 stores the received password from the personal computer into volatile memory, such as DRAM, and makes a setting for shifting the optical disk drive to the security mode (S107). Specifically, an internal flag showing that the operation mode is the security mode is set. Although the password may also be stored in nonvolatile memory, such as flash memory, disappearance of the password induced by turning off of power of the optical disk drive is desirable in order to ensure security. The password stored in volatile memory of the optical disk drive is used as an encryption key when data are recorded and also as a decryption key for decrypting the data. However, the password itself is not recorded in the optical disk and retained in only volatile memory of the optical disk drive. Encryption is performed by means of conversion of an address of the data to be recorded in the optical disk.

When the user does not desire transition of the optical disk drive to the security mode, the user selects an inactive security mode. In this case, since the password is not input, nothing is retained in the volatile memory, and encryption is not performed.

Through foregoing processing, the password necessary to cause the optical disk drive to operate in the security mode is stored in the volatile memory of the optical disk drive. In addition to entering a password by way of a keyboard of the personal computer, the user may also store the password in advance in USB memory, or the like, and input the password by connecting the memory to the personal computer. In a case where the USB memory is connected to the personal computer, the memory may also be connected after undergoing verification.

Figure 3:
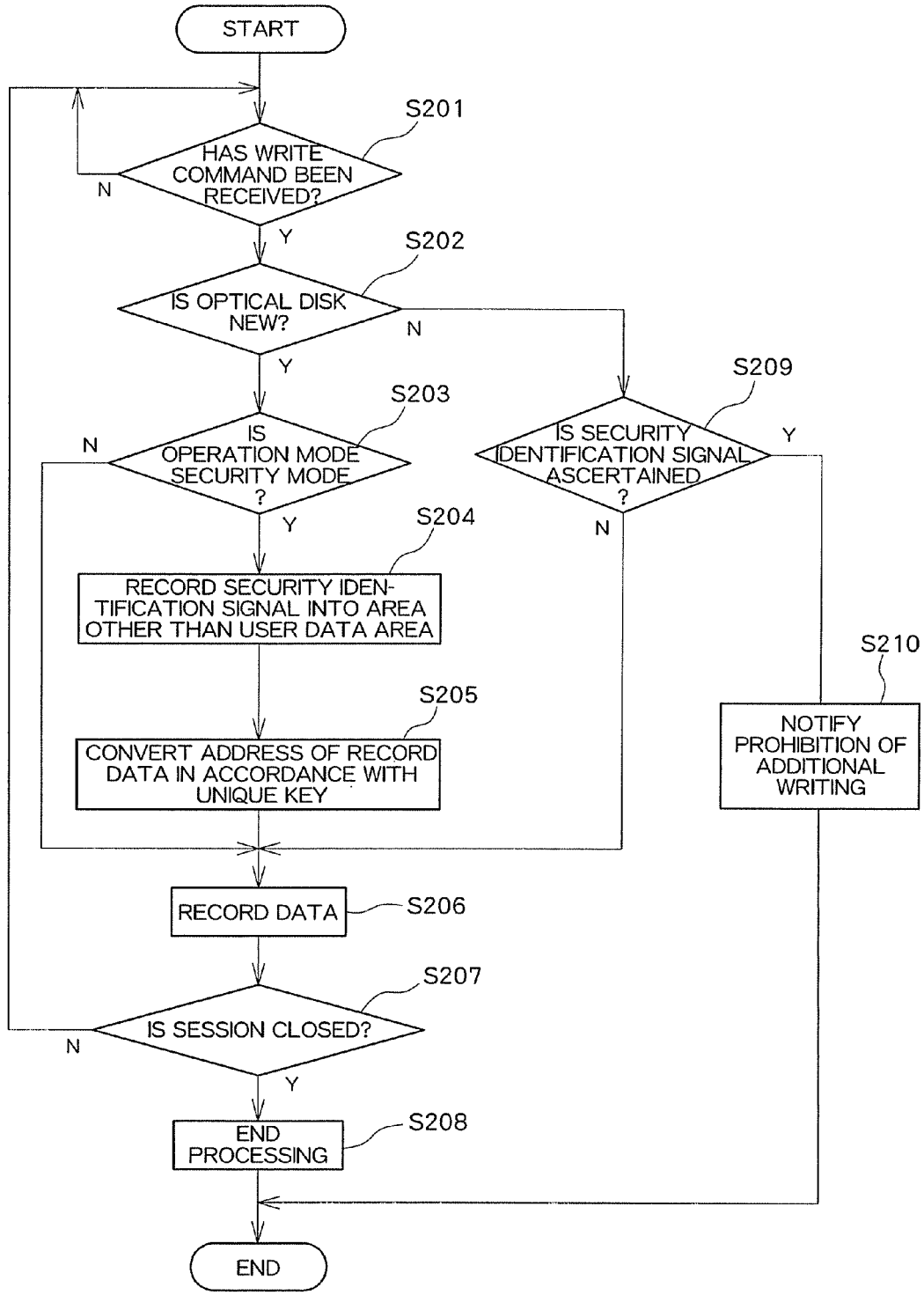
FIG. 3 is a flowchart of processing performed at the time of recording of data.

FIG. 3 shows processing performed at the time of recording of data. The system controller 32 determines whether or not a write command is received from the personal computer (S201). When the write command is received from the personal computer, a determination is made as to whether or not the optical disk 10 inserted into the device is an optical disk 10 which newly records data; namely, whether or not the optical disk 10 has undergone data recording (S202).

When the optical disk 10 is a new optical disk, the system controller 32 determines whether or not the operation mode of the device is a security mode (S203). When the operation mode is a security mode, a security identification signal is first recorded in an area other than a user data area of the optical disk 10 (S204). Specifically, the system controller 32 drives the encoding/decoding circuit 36, the driver 22, and the optical pickup 16, thereby recording the security identification signal in the optical disk 10. The security identification signal is a type of identification information as used herein, and is a signal which shows that data are recorded in the optical disk 10 in the security mode by means of the "security drive," and includes at least a drive ID of the "security drive" and a flag showing that the data have already been encrypted.

The security identification signal only shows that the optical disk 10 is an encrypted "security disk," and does not include key data used for encryption; namely, a password. Therefore, in the event of the loss or theft of the optical disk 10, key data will not be leaked. Furthermore, the security identification signal is recorded not in the user data area but in an area other than the user data area. In the case of copying of the optical disk 10, data in the user data area are read, and the thus-read are written into another optical disk. Therefore, the security identification signal recorded in the area other than the user data area is not copied, and no security identification signal is present in the target optical disk 10. In short, the target optical disk 10 is no longer identified as a "security disk" having a security identification signal. Consequently, so long as a setting is made in such a way that reproduction of data is allowed after the optical disk 10 has been identified as a "security disk," the target optical disk 10 cannot be reproduced, copying of the data can be prevented. For instance, a PCA where OPC is executed can be used as the area other than the user data area. In the case of a DVD-R, a recording information management area, a read-in area, a user data area, and a read-out area are sequentially provided from the inner radius to the outer radius of a disk, and PCA and a recording management information area (RMA) are present in the recording information management area. In the OPC, test data are tentatively written in the PCA while recording power is being changed stepwise prior to recording of data. The tentatively-written test data are reproduced, and the quality of a reproduced signal is evaluated in terms of, such as a β value, a γ value, an error rate, and the like, whereby optimum recording power is determined. The security identification signal is recorded in an arbitrary position on the PCA or a specific area of the PCA which is not used for OPC. In addition to being recorded in the PCA prior to OPC, the security identification signal may also be recorded in the PCA after OPC. In the case of a rewritable optical disk, such as a DVD-RW, the security identification signal may also be recorded so as to be written over the test data after OPC. The security identification signal has a header section and a data section. Information showing that the signal is a security identification signal may also be recorded in the header section, and a security drive ID and other information may also be recorded in the data section.

When a session recorded by means of normal operation and a session recorded in an encrypted manner are mixedly present, information showing the session recorded in an encrypted manner may also be recorded during multi-session recording.

After the security identification signal is recorded in the area other than the user data area, an address of the recorded data is converted by use of the key data stored in the volatile memory; namely, the password (S205). Although a method for converting an address by use of a password is arbitrary, the address is converted by means of, for example, scrambling a sequence of storage by use of a password when the recorded data supplied from the personal computer are stored in the buffer memory 38. Specifically, the buffer memory 38 is divided into a plurality of domains; for example, four domains, a management number is assigned to the respective domains in sequence from one. Provided that the capacity of the buffer memory 38 is 1 MB and that 512 blocks are available, the buffer memory 38 is divided into four domains; namely, the first domain to the fourth domain, management numbers 1 through 128 are assigned to each of the domains. Specifically, the first block to the $128^{th}$ block are present in the first domain, and the first block to the $128^{th}$ block are present in the second domain, as well. The same also applies to the third and fourth domains. First two ASCII codes of the password are converted by a given numerical expression, to thus generate a block number to be stored first. Second and subsequent block numbers are determined from the first management number so as not to overlap each other through use of a given numerical expression. A sequence of four domains is determined by use of the third ASCII code of the password. For example, when a certain letter comes to the third position of the password, data blocks are stored in sequence of the first domain, the third domain, the second domain, and the fourth domain. When another letter comes to the third position of the password, data blocks are stored in sequence of the second domain, the fourth domain, the third domain, and the first domain. Thus, in the case of a certain password "ABCDEFG," the first data block of data to be recorded is stored in the $68^{th}$ block of the first domain; the next data block is stored in the third block of the third domain; and the data block after next is stored in the $120^{th}$ block of the second domain. In the case of another password "STUVWX," the first data block of data to be recorded is stored in the first block of the fourth domain; the next data block is stored in the $89^{th}$ block of the first domain; and the data block after next is stored in the $56^{th}$ block of the second domain. An address is converted by means of converting the sequence of storage of data blocks into the buffer memory 38, and data are recorded (S206).

Figure 4:
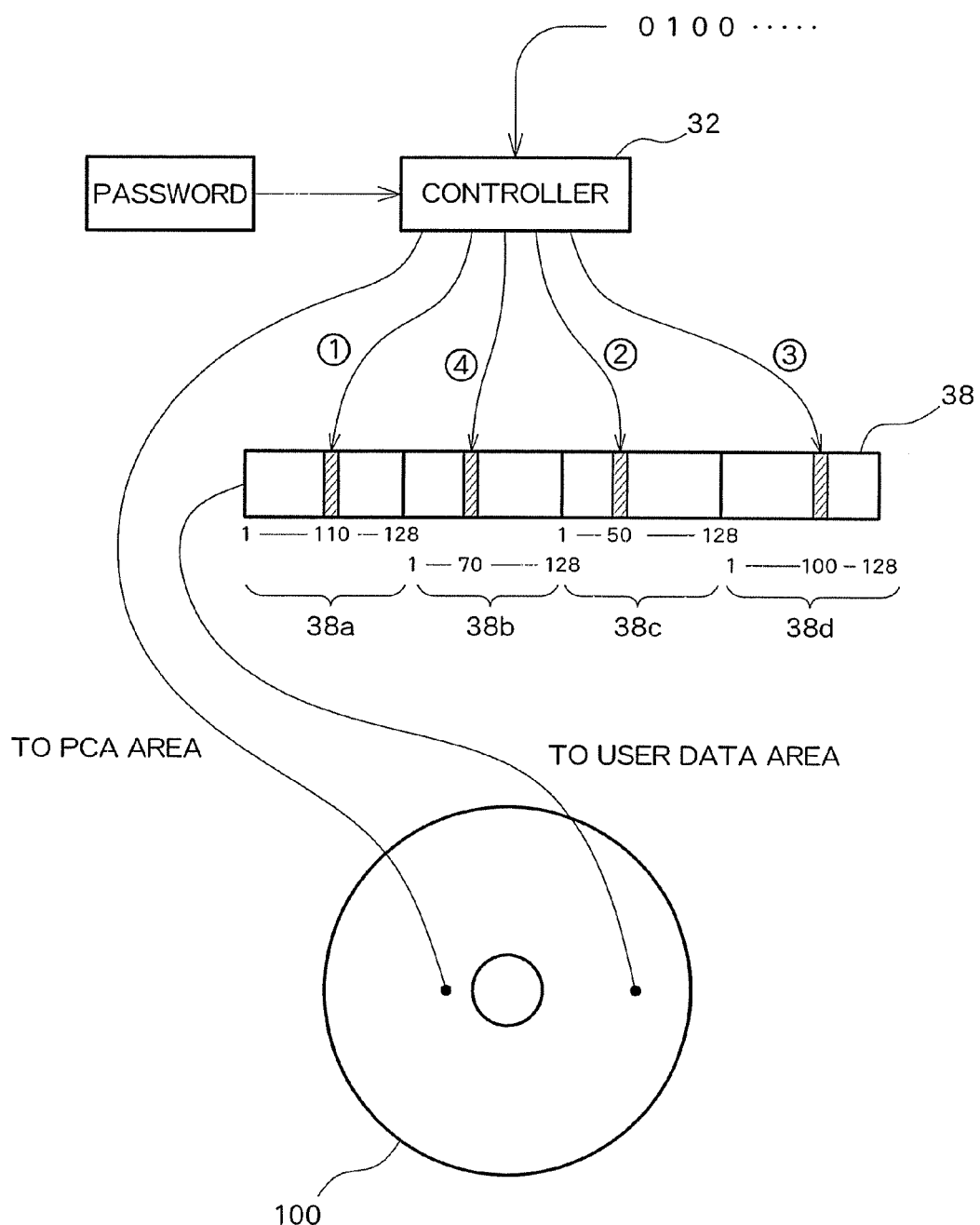
FIG. 4 is a descriptive view of address conversion processing.

FIG. 4 diagrammatically shows address conversion processing of the present embodiment. The system controller 32 receives data to be recorded from the personal computer and stores the thus-received data into the buffer memory 38. Further, the system controller reads the password retained in the volatile memory and converts positions in the buffer memory 38 where data are to be stored, by use of letters of the password. In the normal operation mode, the data to be recorded are stored in sequence from the top of the buffer memory 38. However, in the security mode, storage positions in the buffer memory 38 are converted in accordance with a password. In the drawing, the first data block is stored in the $110^{th}$ block of the first domain 38a of the buffer memory 38; the next data block is stored in the $50^{th}$ block of the third domain 38c; the next data block is stored in the $100^{th}$ block of the fourth domain 38d; and the data block after next is stored in the $70^{th}$ block of the second domain 38b. The data thus stored in the buffer memory 38 are read from the top and recorded in the user data area of the optical disk 10.

Specifically, the system controller 32 drives the driver 22 and the optical pickup 16, to thus record data. The data are recorded in a read sequence from the inner track to the outer track of the optical disk 10. Hence, the data are recorded at addresses differing from those employed in the normal mode, and original data cannot be reproduced even when the data are read as they are.

As mentioned above, the security identification signal is recorded in the area other than the user data area; for example, the PCA. However, a portion of data to be recorded as well as the security identification signal are recorded in an area other than the user data area. Recording a portion of data to be recorded in an area other than the user data area means that, when an address of data to be recorded is converted, a converted address is expanded to an area other than the user data area without being limited to the user data area. A portion of data to be recorded is recorded in an area other than the user data area; for example, in the PCA as in the case of the security identification signal, whereupon the data recorded in the PCA disappear without being copied at the time of copying of the optical disk 10. Hence, the target optical disk 10 becomes an incomplete disk which lacks data. Of the data to be recorded, data recorded in an area other than the user data area are arbitrary, but recording file management data (system information) in the PCA is preferable. According to ISO 9660 format employed in a CD, a PVD (Primary Volume Descriptor) is present in the first sector of the first track of the final session. A volume attribute, the position of a route directory, and the position of a path table which are required to make an access to a file, are described in the PVD. According to a UDF format used in a DVD or the next-generation disk, an AVDP (Anchor Volume Descriptor Pointer) is present at the $257^{th}$ block of the final border. Consequently, recording the PVD or AVDP into the PCA is preferable, whereby neither the PVD nor the AVDP is present in a target optical disk, to thus prevent copying. When file management data, such as the PVD or the AVDP, are recorded in the PCA, an area for the file management data to be recorded in the user data area becomes blank, and insignificant dummy data are recorded in that area in place of the file management data. FIG. 4 shows that the security identification signal and the system information are recorded in the PCA and that other data are recorded in the user data area. All of sets of the file management data may also be recorded in the PCA, or only a portion of the file management data may also be recorded in the PCA.

As a matter of course, the address conversion method is not limited to that mentioned above. Arbitrary numbers 1 through 512 may also be assigned to data blocks by use of a password without division of the buffer memory 38, and data blocks may be stored in block positions indicated by the numerals assigned to the first block to the $512^{th}$ block of the buffer memory 38. Moreover, the buffer memory 38 may be divided into two domains, and data may be stored alternately. The password retained in the volatile memory can be said to be key data which define the sequence of storage, into the buffer memory 38, of data to be recorded.

Data are recorded as mentioned above, and processing is repeatedly performed until a session is closed (S207). When the session is closed, terminate processing is performed (S208), whereby processing for recording data is completed.

In the meantime, when the optical disk 10 is not a new disk; namely, when data are already recorded in the optical disk 10, a determination is next made as to whether or not the security identification signal is present (S209). In the case of the "security disk," the security identification signal is recorded in a specific area other than the user data area; for example, the PCA, the optical pickup 16 is caused to perform seeks up to the PCA, thereby reading the security identification signal. When the security identification signal is present in the PCA, the optical disk is a "security disk," and hence the system controller 32 prohibits writing of additional data (S210). As a result, tampering of data, or the like, is prevented. In this case, the system controller 32 notifies the personal computer that the optical disk is the security disk. Pursuant to the notification from the system controller 32, the CPU of the personal computer displays prohibition of writing of additional data on the screen. When the security identification signal is not present, the optical disk is not the security disk, and hence recording of data in a normal operation mode is allowed (S206). In short, data to be recorded are recorded, in unmodified form, into the user data area without involvement of address conversion. Even when the optical disk 10 is new and when the optical disk drive is not set to the security mode, data to be recorded are recorded, as they are, in the user data area without involvement of address conversion. Therefore, file management data are also recorded in the user data area.

In sum, when the new optical disk 10 is inserted, the system controller 32 of the optical disk drive records the security identification signal in the PCA in the security mode, and subjects the recorded signal to address conversion, thereby recording user data into the user data area. Moreover, a portion of the user data; for example, file management data, is recorded in the PCA. When the recorded optical disk 10 is inserted, the system controller 32 of the optical disk drive prohibits writing of additional data, regardless of the security mode or the normal operation mode, in a case where the security identification signal is present and allows writing of additional data in a case where the security identification signal is not present. In a case where the security identification signal is not present and where the current mode is the security mode, the security identification signal is recorded in the PCA with regard to an additional portion and subjected to address conversion, where upon user data are recorded in the user data area. Moreover, a portion of the user data; for example, at least a portion of the file management data, may also be recorded in the PCA. In this case, an encrypted data area and an unencrypted data are mixedly present in the optical disk 10.

Although the security identification signal may also be recorded in the PCA prior to data recording, the signal may also be recorded in the PCA after completion of data recording. Moreover, in the case of the recorded disk and in a case where the security identification signal is present, a determination is made as to whether or not a security drive ID included in the security identification signal coincides with the drive ID of the optical disk drive. When a match exists between the IDs, writing of additional data may also be allowed. When a match does not exist between the IDs, writing of additional data may also be prohibited.

Figure 5:
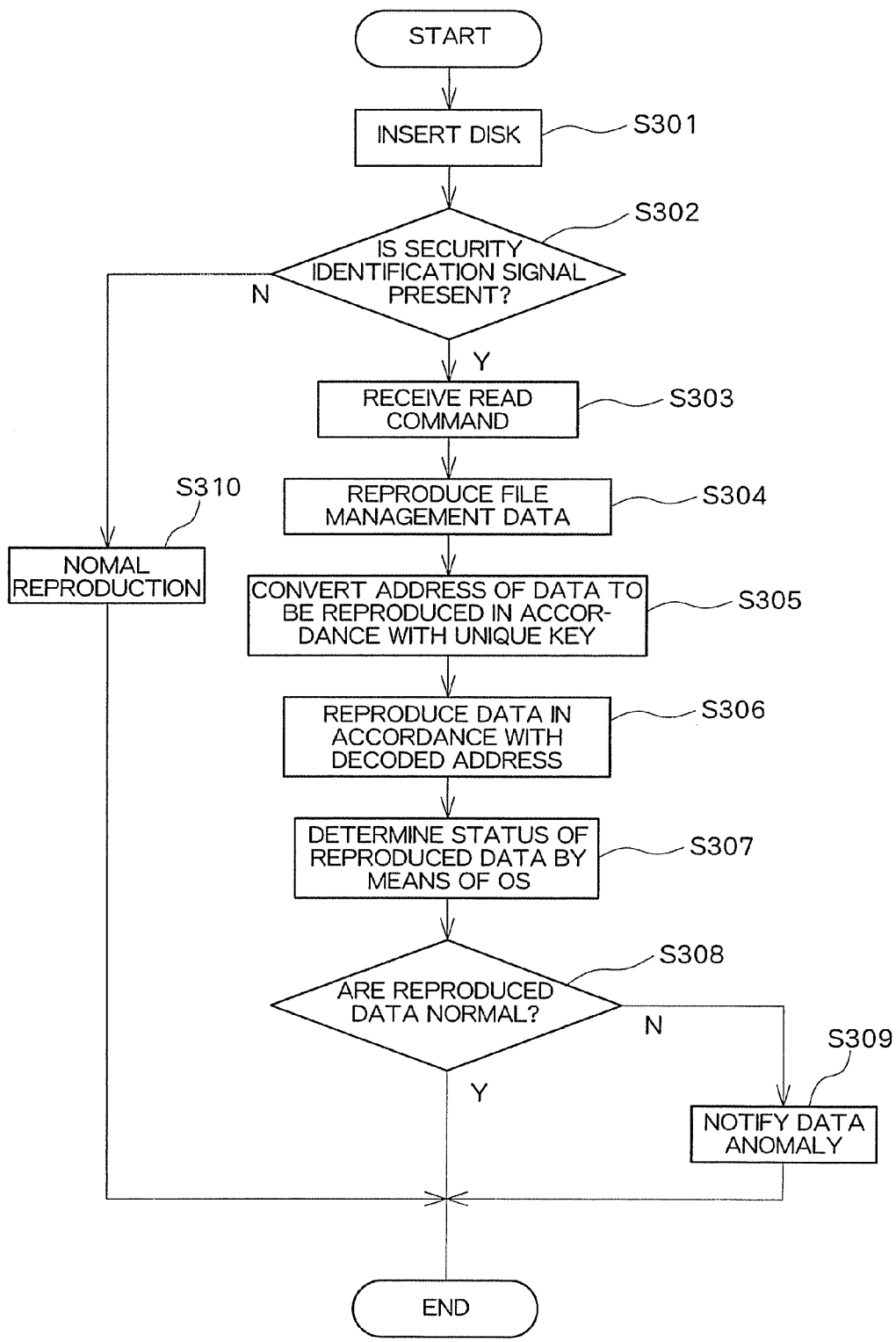
FIG. 5 is a flowchart of processing performed at the time of reproduction of data.

FIG. 5 shows data reproduction processing performed in the security mode. First, when the optical disk 10 is inserted (S301), the system controller 32 determines whether or not the security identification signal is present (S302). When the security identification signal is present, a read command is received from the personal computer (S303), and file management data recorded in an area other than the user data area; for example, the PCA, are reproduced (S304). Moreover, data are sequentially read from the user data area, and the thus-read data are stored in the buffer memory 38. The location in the buffer memory 38 where the data are stored is converted by use of the password retained in the volatile memory, thereby inversely converting the address (S305). Specifically, since the address is converted by use of the password at the time of data recording, the data are reproduced in the original sequence by means of inversely converting the address of the data read by use of the same password. On the assumption that, when the password employed at the time of recording of data is different from that employed at the time of reproduction of data; for example, when the optical disk drive used for recording data is different from the optical disk drive which will be used for reproducing data, inverse conversion of the address is not correct, and hence data cannot be reproduced. The address is inversely converted by use of the password as mentioned above, thereby reproducing data (S306), and reproduced data are supplied to the personal computer. The CPU of the personal computer determines the state of reproduced data on the operating system (S307). When reproduced data are normal, processing is terminated (S308). In the mean time, when reproduced data are anomalous, an anomaly appears on the display (S309).

In the meantime, when the security identification signal is not present in the inserted optical disk 10, the system controller 32 performs normal reproducing operation (S310). Consequently, data can be reproduced from a normal disk which is not the security disk, by means of normal reproducing operation. Moreover, in the case of the optical disk 10 to which the security disk is copied, data cannot be reproduced by means of normal reproducing operation, because data are scrambled.

When the optical disk drive is set to a normal operation mode, normal reproducing operation is performed at all times without regard to presence or absence of the security identification signal (without determining whether or not the security identification signal is present). Consequently, in the case of the security disk, data cannot be reproduced normally, and data cannot also be reproduced from the optical disk to which the security disk is copied. Data can be reproduced normally only in the case of a non-security disk.

As mentioned above, the optical disk drive of the present embodiment has the security mode and the normal operation mode. When data are recorded in the security mode, the security identification signal and the file management data are recorded in areas other than the user data area, the address of the user data is converted, and the user data are recorded in the user data area, whereby the data are encrypted. Address conversion is performed by use of the password, and the password is not recorded in the optical disk 10 but retained in the volatile memory of the optical disk drive. The password disappears as a result of power of the optical disk drive being turned off. When data are reproduced in the security mode, a determination is made as to whether or not the security identification signal is present. When the security identification signal is present, the data are reproduced by inverse conversion of the address of the data read by use of the password retained in the volatile memory. Through such processing, the data recorded in the optical disk are protected, and copying of the optical disk can be prevented.

Although the present embodiment has illustrated an optical disk as a portable recording medium, the present invention is not limited to the optical disk but can also be applied to another memory such as SD memory.

The password is used as key data for address conversion in the present embodiment, but data to be recorded may also be encrypted by use of the password after being subjected to address conversion.

What is claimed is:

1. A data recorder for recording data in converted addresses on a portable recording medium having a user data area and a non-user-data area, comprising:
a memory unit configured to store key data; and a controller configured to: (a) record security identification information, which indicates that the data recorded on the portable recording medium are encrypted, in the non-user-data area, (b) to covert addresses of the data to be recorded in the user data area of the portable recording medium by use of the key data such that the converted addresses are expanded to include both the user data area and the non-user-data area, and (c) to record a first portion of the data in the user data area and a second portion of the data in the non-user-data area, wherein the user data area contains blank addresses after the addresses are converted and the blank addresses are recorded with dummy data.

2. The data recorder according to claim 1, wherein the portable recording medium is an optical disk and at least a portion of the non-user-data area is located radially inward of the user data area of the optical disk; and the controller is configured to record the security identification information in a power calibration area (PCA) of the optical disk.

3. The data recorder according to claim 1, wherein the security identification information includes a data recorder ID and an indication that the data recorded on the portable recording medium are encrypted, but does not include the key data used for encryption.

4. A data reproducing apparatus which has a security mode and a normal mode as operation modes and which reproduces data recorded in converted addresses on a portable recording medium having a user data area and non-user-data area, comprising:

retaining means for retaining key data, wherein addresses of the data to be recorded in the user data area of the portable recording medium are converted by use of the key data such that the converted addresses are expanded to include both the user data area and the non-user-data area, and the user data area contains blank addresses after the addresses are converted and the blank addresses are recorded with dummy data;

determination means which, when the data are reproduced from the portable recording medium in the security mode, determines whether or not security identification information, which indicates that the data recorded are encrypted, is recorded in the non-user-data area of the portable recording medium; and reproducing means which, when the security identification information is recorded, reads a first portion of the data and the dummy data in the user data area and a second portion of the data in the non-user-data area, and rearranges the first and second portions of the data read from the portable recording medium by use of the key data and which, when the security identification information is not recorded, reproduces the first portion of the data and the dummy data in the user data area and the second portion of the data in the non-user-data area of the portable recording medium without rearranging them.

5. A data recording-and-reproducing apparatus which has a security mode and a normal mode as operation modes and which reproduces data recorded in converted addresses on a portable recording medium having a user data area and a non-user-data area, comprising:

a memory unit configured to store key data;

a controller configured to: (a) record, in the security mode, security identification information, which indicates that the data recorded on the portable recording medium are encrypted, in the non-user-data area, (b) to convert addresses of the data to be recorded in the user data area of the portable recording medium by use of the key data such that the converted addresses are expanded to include both the user data area and the non-user-data area, (c) to record a first portion of the data in the user data area and a second portion of the data in the non-user-data area, wherein the user data area contains blank addresses after the addresses are converted and the blank addresses are recorded with dummy data, (d) to determine, when the data are reproduced from the portable recording medium in a security mode, whether or not the security identification information is recorded in the non-user-data area of the portable recording medium, (e) when the security identification information is recorded, to read the first portion of the data and the dummy data in the user data area and the second portion of the data in the non-user-data area and to replace the dummy data read in the user data area with the second portion of the data read in the non-user-data area and rearrange the first and second portions of the data by use of the key data, and (f) when the security identification information is not recorded, to reproduce the first portion of the data and the dummy data in the user data area and the second portion of the data in the non-user-data area of the portable recording medium without rearranging them.

6. The data recorder according to claim 1, wherein the second portion of the data is a portion of file management information.

7. The data reproducing apparatus according to claim 4, wherein the second portion of the data is a portion of file management information.

8. A method of recording data in converted addresses on a portable recording medium having a user data area and a non-user-data area, the method having a security mode and a normal mode as operation modes and comprising:

receiving a first portion of data to be recorded in the user data area;

receiving a second portion of data to be recorded in the user data area;

converting addresses of the first and second portions of data by use of key data such that the converted addresses are expanded to include both the user data area and the non-user-data area and the user data area contains blank addresses after the addresses are converted;

recording, in the security mode, security identification information, which indicates that the data recorded on the portable recording medium are encrypted, in the non-user-data-area, recording the first portion of data in the converted addresses in the user data area;

recording the second portion of data in the converted addresses in the non-user-data area; and recording dummy data in the blank addresses of the user data area.

9. A data recorder for recording data in converted addresses on a portable recording medium having a user data area and a non-user-data area, wherein the data recorder has a security mode and a normal mode as operation modes, comprising:

a memory unit configured to store key data; and a controller configured to: (a) record, in the security mode, security identification information, which indicates that the data recorded on the portable recording medium are encrypted, in the non-user-data area, and not record the security identification information in the normal mode (b) to covert addresses of the data to be recorded in the user data area of the portable recording medium by use of the key data such that the converted addresses are expanded to include both the user data area and the non-user-data area, and (c) to record a first portion of the data in the user data area and a second portion of the data in the non-user-data area, wherein the user data area contains blank addresses after the addresses are converted and the blank addresses are recorded with dummy data.

10. A data recorder for recording data in converted addresses on a portable recording medium having a user data area and a non-user-data area, comprising:
- a memory unit configured to store key data; and
- a controller configured to: (a) record security identification information, which indicates that the data recorded on the portable recording medium are encrypted, in the non-user-data area, (b) to covert addresses of the data to be recorded in the user data area of the portable recording medium by use of the key data such that the converted addresses are expanded to include both the user data area and the non-user-data area, and (c) to record a first portion of the data in the user data area and a second portion of the data in the non-user-data area, wherein the user data area contains blank addresses after the addresses are converted and the blank addresses are recorded with dummy data,
- wherein the controller is further configured to determine whether or not the security identification information is already recorded in the non-user-data area of the portable recording medium indicating that the data recorded on the portable recording medium are encrypted, and when it is determined that the security identification information is recorded, to prohibit recording of additional data on the portable recording medium, which would otherwise be performed and, when it is determined that the security identification information is not recorded, to allow recording of additional data.

11. A data recorder for recording data in converted addresses on a portable recording medium having a user data area and a non-user-data area wherein the data recorder has a security mode and a normal mode as operation modes, comprising:
- a volatile memory unit configured to store key data; and
- a controller configured to: (a) record security identification information, which indicates that the data recorded on the portable recording medium are encrypted, in the non-user-data area, (b) to covert addresses of the data to be recorded in the user data area of the portable recording medium by use of the key data such that the converted addresses are expanded to include both the user data area and the non-user-data area, and (c) to record a first portion of the data in the user data area and a second portion of the data in the non-user-data area, wherein the user data area contains blank addresses after the addresses are converted and the blank addresses are recorded with dummy data,
- wherein the controller is further configured to store a password input in the security mode, to thus retain the password as the key data in the volatile memory unit, and to record the data on the portable recording medium without converting the addresses in the normal mode.

* * * * *